(12) United States Patent
Adamski et al.

(10) Patent No.: US 7,133,775 B2
(45) Date of Patent: Nov. 7, 2006

(54) PREVIEWING POINTS OF INTEREST IN NAVIGATION SYSTEM

(75) Inventors: Mark D. Adamski, Westfield, IN (US); Jeffrey H. Burch, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 266 days.

(21) Appl. No.: 10/780,029

(22) Filed: Feb. 17, 2004

(65) Prior Publication Data

US 2005/0182563 A1    Aug. 18, 2005

(51) Int. Cl.
G01C 21/36    (2006.01)
G08G 1/0969   (2006.01)

(52) U.S. Cl. ............... 701/211; 701/207; 701/209; 701/210; 340/995.17; 340/995.24

(58) Field of Classification Search ........ 701/211, 701/207, 201, 208, 209, 212; 340/995.14, 340/995.15, 995.17, 995.2, 995.24
See application file for complete search history.

(56) References Cited

U.S. PATENT DOCUMENTS

| | | | | |
|---|---|---|---|---|
| 5,430,655 A | * | 7/1995 | Adachi ................... | 701/209 |
| 5,729,109 A | * | 3/1998 | Kaneko et al. .......... | 318/587 |
| 5,739,772 A | * | 4/1998 | Nanba et al. ............ | 340/990 |
| 5,802,492 A | | 9/1998 | Delorme et al. | |
| 6,018,697 A | * | 1/2000 | Morimoto et al. ........ | 701/209 |
| 6,078,863 A | * | 6/2000 | Schmischke et al. ..... | 701/209 |
| 6,119,066 A | * | 9/2000 | Sugiura et al. .......... | 701/208 |
| 6,138,073 A | * | 10/2000 | Uchigaki ................. | 701/208 |
| 6,324,472 B1 | * | 11/2001 | O'Shea ................... | 701/211 |
| 6,633,813 B1 | * | 10/2003 | Deworetzki .............. | 701/209 |
| 6,859,724 B1 | * | 2/2005 | Komatsu ................. | 701/202 |

FOREIGN PATENT DOCUMENTS

| | | |
|---|---|---|
| EP | 1 065 471 | 1/2001 |
| EP | 1 233 251 | 8/2002 |
| WO | 03/093765 | 11/2003 |

* cited by examiner

Primary Examiner—Tan Q. Nguyen
(74) Attorney, Agent, or Firm—Jimmy L. Funke

(57) ABSTRACT

A vehicle navigation system provides information relating to a list of intersections or other points of interest located ahead of a vehicle relative to a heading vector of the vehicle. The vehicle navigation system uses information about the current location of the vehicle and the heading vector in connection with a navigation database to identify a list of the intersections or other points of interest along the current street. The vehicle navigation system presents this information to an occupant of the vehicle. As the vehicle progresses and makes turn maneuvers, the navigation system updates the list of intersections or other points of interest that the vehicle is approaching. The occupant can receive information regarding points of interest without needing to enter a planned destination beforehand. In addition, the occupant can determine the location of the vehicle relative to the surrounding area without the clutter of irrelevant map details.

30 Claims, 2 Drawing Sheets

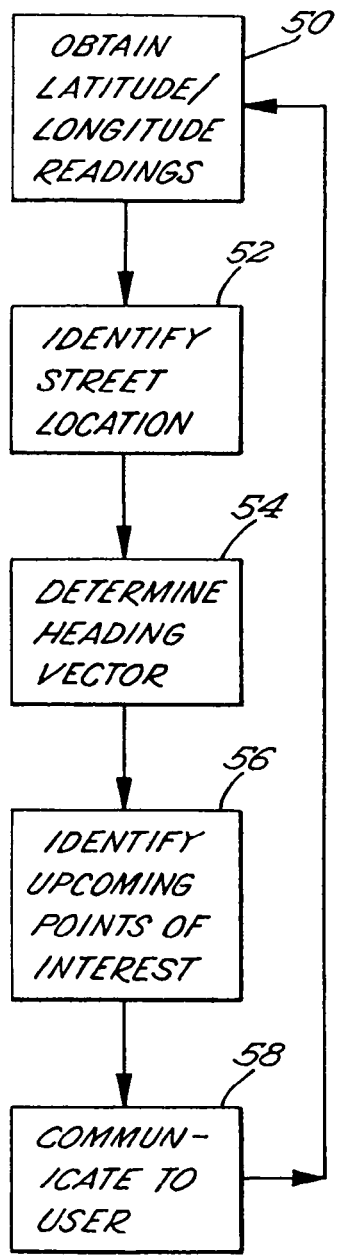
Fig 2
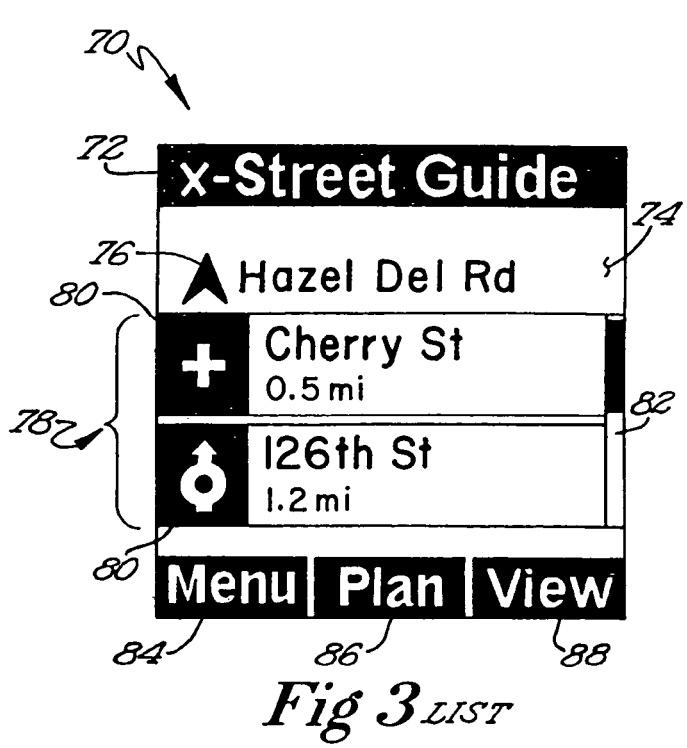
Fig 3 LIST
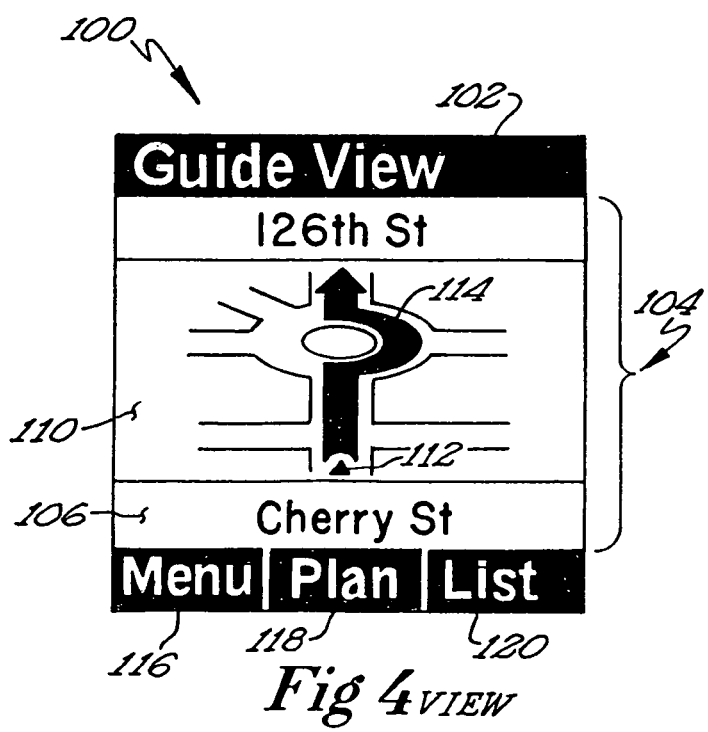
Fig 4 VIEW

PREVIEWING POINTS OF INTEREST IN NAVIGATION SYSTEM

TECHNICAL FIELD

The disclosure relates generally to vehicle navigation systems. More particularly, the disclosure relates to graphic user interfaces for use in connection with vehicle navigation systems.

BACKGROUND

An increasing number of vehicles are equipped with on-board navigation systems that display the position of the vehicle and surrounding streets, intersections, and other points of interest. Some navigation systems allow the driver to input or program a route. The navigation system then displays the position of the vehicle along the route.

In addition to displaying the vehicle position along a route, a navigation system can typically also display the vehicle location even when no route is programmed. In this case, the navigation system does not have a route that provides a context for the display. Some navigation systems that incorporate relatively large color display screens can display the vehicle location in the context of a detailed map reference of the surrounding area when no route is programmed.

Other navigation systems, however, incorporate smaller display screens. Rendering the vehicle location is difficult because the display screen is too small to display a map reference that is both sufficiently detailed and sufficiently free of clutter to be useful. For example, the map reference may be rendered at a sufficient level of detail, but contain so much clutter as to be unreadable from the position of the driver. Even with a relatively large display screen, some users may find a detailed map reference too cluttered to be useful. On the other hand, the map reference may be sufficiently free of clutter to allow the driver to locate the visual representation of the car, but lack detailed information as to surrounding streets. In either case, the driver does not significantly benefit from the map reference.

SUMMARY OF THE DISCLOSURE

According to various example implementations, a vehicle navigation system provides an occupant of a vehicle with information relating to a list of intersections or other points of interest located ahead of the vehicle relative to the current direction of travel of the vehicle. The vehicle navigation system uses information about the current location of the vehicle and a heading vector that indicates the current direction of travel in connection with a navigation database to identify a list of the intersections or other points of interest along the current street. The vehicle navigation system presents this information to the occupant. As the vehicle progresses and makes turn maneuvers, the navigation system updates the list of intersections or other points of interest that the vehicle is approaching.

In one implementation, information relating to a location of a vehicle is communicated to an occupant of the vehicle in the absence of predetermined route information by determining the location of the vehicle and a heading vector associated with the vehicle. A point of interest is identified as a function of the location of the vehicle and the heading vector associated with the vehicle. This point of interest is then communicated to the occupant of the vehicle.

Another implementation is directed to a navigation system for use in a vehicle. A global positioning system (GPS) receiver is configured to determine a location of the vehicle. A data retrieval device is configured to retrieve, from a data storage medium, navigation data representing a plurality of points of interest. A processor-based subsystem is operatively coupled to the GPS receiver and to the data retrieval device. The processor-based system is configured to determine a heading vector associated with the vehicle and to receive the navigation data from the data retrieval device. The processor-based system is further configured to select a point of interest from the plurality of points of interest as a function of the location of the vehicle and the heading vector associated with the vehicle and to communicate the point of interest to an occupant of the vehicle.

In still another embodiment, a processor-readable medium contains processor-executable instructions. When executed by a processor-based system in a vehicle, the processor-executable instructions cause the processor-based system to determine a location of the vehicle and a heading vector associated with the vehicle. The processor-based system then identifies a point of interest as a function of the location of the vehicle and the heading vector associated with the vehicle and communicates the point of interest to the occupant of the vehicle.

Various implementations may provide certain advantages. The navigation system communicates information regarding upcoming intersections and points of interest based on the current location and heading vector of the vehicle. As a result, the occupant can receive information regarding points of interest without needing to enter a planned destination beforehand. Even when a destination is entered, the occupant can benefit from being able to determine the location of the vehicle relative to the surrounding area without the clutter of irrelevant map details.

Additional advantages and features will become apparent from the following description and the claims that follow, considered in conjunction with the accompanying drawings.

BRIEF DESCRIPTION OF THE DRAWINGS

FIG. 2 is a flow diagram illustrating a method of communicating information relating to a location of a vehicle according to another embodiment.

FIG. 3 illustrates an example graphic user interface (GUI) that may be presented to the user.

FIG. 4 depicts another example GUI that may be presented to the user.

DETAILED DESCRIPTION OF VARIOUS EMBODIMENTS

Figure 1:
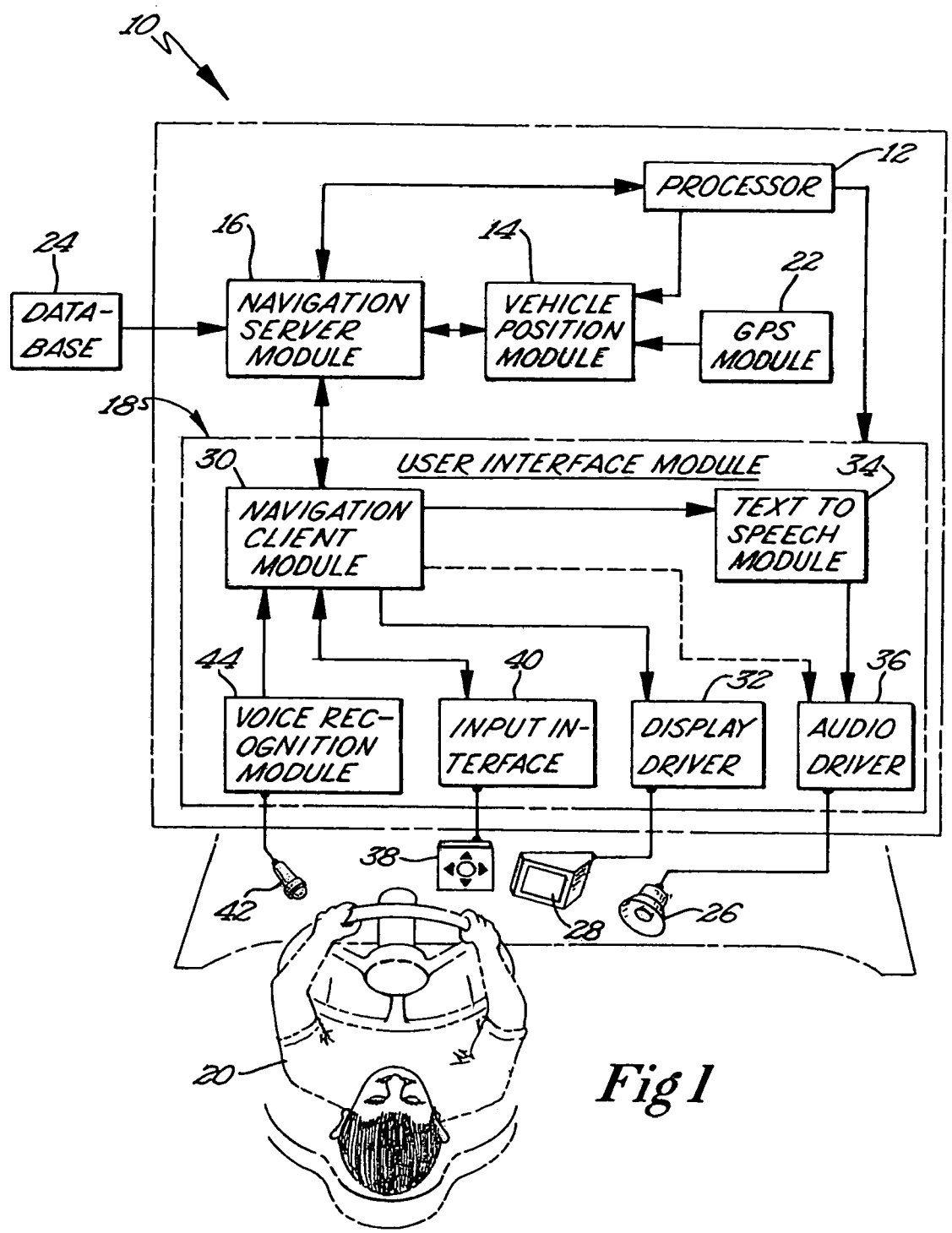
FIG. 1 is a block diagram depicting a vehicle navigation system according to an embodiment.

A vehicle navigation system provides an occupant of a vehicle with information relating to a list of intersections or other points of interest located ahead of the vehicle relative to the current direction of travel of the vehicle. Using a global positioning system (GPS), for example, the vehicle navigation system obtains information about the current location of the vehicle and a heading vector that indicates the current direction of travel. The vehicle navigation system uses this information in connection with a navigation database to identify a list of the intersections or other points of interest along the current street. Based on the current location of the vehicle and the heading vector, the vehicle navigation system determines which intersections or other points of interest the vehicle is approaching and presents this information to the occupant.

As the vehicle progresses along the street and makes turn maneuvers, the navigation system updates the list of intersections or other points of interest that the vehicle is approaching. Because the navigation system presents information to the occupant based on the current location and heading vector of the vehicle rather than on pre-programmed route information, the occupant can receive information regarding points of interest without needing to enter a planned destination beforehand. Communication of information to the occupant is enhanced, particularly in relatively inexpensive vehicle navigation systems having small display screens. Such systems are better able to provide the occupant with enough information to discern nearby points of interest without cluttering the screen with so much information that the display becomes unusable by the occupant. Navigation systems having larger screens can also benefit from reduced clutter.

Various embodiments are described as displaying information without reference to a predetermined route. It will be appreciated by those of skill in the art, however, that the methods and apparatuses described herein can also be used to display information when a destination is entered. When a destination is entered, the occupant can determine the location of the vehicle relative to the surrounding area without the clutter of irrelevant map details.

The following description of various embodiments implemented in a vehicle navigation system is to be construed by way of illustration rather than limitation. This description is not intended to limit the invention or its applications or uses. For example, while various embodiments are described as being implemented in a vehicle navigation system, it will be appreciated that the principles described herein may be applicable to navigation systems operable in other environments.

In the following description, numerous specific details are set forth in order to provide a thorough understanding of various embodiments. It will be apparent to one skilled in the art that the present invention may be practiced without some or all of these specific details. In other instances, well known components and process steps have not been described in detail in order to avoid unnecessarily obscuring the present invention.

Various embodiments may be described in the general context of processor-executable instructions, such as program modules, being executed by a processor. Generally, program modules include routines, programs, objects, components, data structures, etc., that perform particular tasks or implement particular abstract data types. In addition, some embodiments may also be practiced in distributed processing environments in which tasks are performed by remote processing devices that are linked through a communications network or other data transmission medium. In a distributed processing environment, program modules and other data may be located in both local and remote storage media, including memory storage devices.

Referring now to the drawings, FIG. 1 illustrates a vehicle navigation system 10. The vehicle navigation system 10 includes a processor-based system comprising a processor 12 configured to execute a number of software modules, including a vehicle position module 14, a navigation server module 16, and a user interface module 18. As described below, the processor 12 may interface with a user 20 via one or more input and output devices controlled by the user interface module 18. The user 20 can be the driver of the vehicle or, alternatively, a passenger.

The processor 12 is typically configured to operate with one or more types of processor readable media. Processor readable media can be any available media that can be accessed by the processor 12 and includes both volatile and nonvolatile media, removable and non-removable media. By way of example, and not limitation, processor readable media may include storage media and communication media. Storage media includes both volatile and nonvolatile, removable and nonremovable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the processor 12. Communication media typically embodies processor-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor-readable media.

The vehicle position module 14 determines the location of the vehicle, for example, by obtaining data from a GPS module 22. Alternatively, the vehicle position module 14 may determine the location of the vehicle in another way, such as by measuring the distance and direction traveled from a known reference point. In addition to the location of the vehicle, the vehicle position module 14 determines a heading vector, or direction of travel, of the vehicle. The vehicle position module 14 may determine the heading vector using any of a variety of conventional techniques.

The vehicle position module 14 provides the location and heading vector information to the navigation server module 16. The navigation server module 16 uses this information in combination with information relating to points of interest, such as intersections, to identify one or more points of interest that the vehicle is approaching. This information may be contained in a database 24. The database 24 may be stored in any of a variety of processor-readable media, including, for example, optical discs including CD-ROMs and DVD-ROMs, memory cards, and the like.

When the navigation server module 16 has identified one or more points of interest that the vehicle is approaching, the navigation server module 16 provides this information to the user 20 using one or more output devices, such as a speaker 26 or a display screen 28, controlled via the user interface module 18. The speaker 26 may be part of a vehicle audio system or a standalone speaker. The display screen 28 is typically part of a vehicle information system, but may be implemented as a standalone display screen.

In the embodiment shown in FIG. 1, the navigation server module 16 provides the information regarding points of interest that the vehicle is approaching to a navigation client module 30. The navigation client module 30 in turn generates graphic output, audio output, or both. A display driver 32 processes the graphic output and renders the graphic output on the display screen 28. The audio output may include speech, sound effects, or both. Speech output may be generated, for example, as a synthesized rendering of a name of an intersection or other point of interest by a text-to-speech module 34. Sound effects may include, for example, chimes or other sounds to alert the user 20 of certain types of points of interest, such as intersections or restaurants. Both speech and sound effects are processed by an audio driver 36, which renders the audio output using the speaker 26.

In addition to providing output to the user 20, the user interface module 18 can also receive input from the user 20. For example, the user 20 may advance through the list of upcoming points of interest using a keypad 38 or other input device. An input interface 40 provides the input to the navigation client module 30, which makes appropriate changes to the display or audio output according to the input. Further, in some embodiments, the user 20 may interact with the vehicle navigation system 10 by voice commands spoken into a microphone 42. A voice recognition module 44 converts the voice commands to text or another format that can be processed by the vehicle navigation system 10.

FIG. 2 is a flow diagram illustrating an example method executed by the processor 12 of FIG. 1 to communicate to the user 20 information relating to intersections or other points of interest that the vehicle is approaching. The processor 12 may communicate this information when the user 20 has not entered a destination or other route information. Further, the processor 12 may also communicate this information when the user 20 has entered a destination or other route information.

The vehicle position module 14 obtains from the GPS module 22 information relating to the position of the vehicle, including, for example, latitude and longitude readings (50). Based on the latitude and longitude readings and information received in the navigation server module 16 from the database 24, the processor 12 determines the street on which the vehicle is currently located (52). In addition to the location of the vehicle, the vehicle position module 14 determines a heading vector (54) that indicates the direction in which the vehicle is traveling. The vehicle position module 14 may determine the heading vector using any of a variety of conventional techniques.

Based on the location and heading vector of the vehicle, the processor 12 identifies one or more intersections or other points of interest that the vehicle is approaching (56). In some implementations, for example, the intersections or other points of interest are associated in the database 24 with location information, e.g., longitude and latitude coordinates or street identifiers. For instance, the database 24 may contain a list of street names, each of which is associated with a list of intersections located on the corresponding street.

The navigation server module 16 executing on the processor 12 compares the location information associated with the intersections or other points of interest with the location and heading vector of the vehicle. In this way, the navigation server module 16 determines which intersections or other points of interest are located in the vicinity of the vehicle and in the current direction of travel of the vehicle. The navigation server module 16 optionally also identifies which intersections or other points of interest are located in the vicinity of and behind the vehicle, i.e., points of interest that the vehicle has passed.

The user interface module 18 then communicates the information (58) relating to nearby intersections or other points of interest to the user 20 via one or more output devices, including, but not limited to, the speaker 26, the display screen 28, or both. For example, the user interface module 18 may display graphic representations of the point of interest and of the vehicle using the display screen 28. These graphic representations may include a detailed view of an upcoming intersection. The user interface module 18 may display text in addition to or instead of the graphic representations. The text may include, for example, names of and distances to intersecting streets. Further, the user interface module 18 may generate an audible indicator of the point of interest using the speaker 26, either instead of or in addition to providing a visual indicator. This audible indicator may include speech, sound effects, or both.

If the street on which the vehicle is located contains multiple intersections or other points of interest, the user interface module 18 may communicate some or all of these points of interest to the user 20. For example, the user interface module 18 may inform the user 20 of all upcoming intersections, but omit information relating to other types of points of interest. The user interface module 18 may communicate multiple points of interest as a sequence of successive points of interest. In some implementations, the user interface module 18 advances through the sequence in response to input received from the user 20 via an input device, such as the keypad 38 or the microphone 42. The user interface module 18 may also advance through the sequence in response to movement of the vehicle, for example, as a function of the distance of the vehicle from a point of interest or as a function of the speed of the vehicle.

To ensure that the information communicated to the user 20 relates to the current position of the vehicle, the processor 12 periodically obtains updated information relating to the location and heading vector of the vehicle (50). In this way, as the vehicle progresses and makes turn maneuvers, the vehicle navigation system 10 looks ahead to update upcoming intersection information to the user 20. As a result, the user 20 can look ahead in the direction of travel without entering a planned destination and gain a sense of the vehicle location relative to intersections and other points of interest.

FIG. 3 illustrates an example graphic user interface (GUI) 70 that the user interface module 18 may present to the user 20. A title bar 72 identifies the GUI 70 as a street guide. Immediately below the title bar 72, a text bar 74 identifies the street on which the vehicle is currently located. An icon 76, such as an arrowhead, may indicate the direction of travel of the vehicle using a conventional north-up representation. Below the text bar 74, a dynamic intersection list 78 conveys information relating to upcoming intersections or other points of interest. The dynamic intersection list 78 includes the names of upcoming intersections and the distances to those intersections. Icons 80 may indicate the type of intersection or other point of interest. As depicted in FIG. 3, for example, Cherry St. is a typical intersection, and 126th St. is a traffic circle. A scroll bar 82 indicates the position of the currently displayed points of interest relative to a sequence of points of interest. The dynamic intersection list 78 is automatically updated as the vehicle progresses. In addition, the user 20 can scroll through the dynamic intersection list 78 using the keypad 38, the microphone 42, or another suitable input device.

Below the dynamic intersection list 78, soft key indicators facilitate activation of various features. For example, a "menu" soft key indicator 84 may allow the user 20 to access a menu of configuration and other options. A "plan" soft key indicator 86 may allow the user 20 to access a menu for planning a route, e.g., by selecting from a list of recent destinations or favorite destinations. A "view" soft key indicator 88 may allow the user 20 to toggle the display to show a detailed intersection view as depicted in FIG. 4. In some implementations, the soft key indicators 84, 86, and 88 are visually and logically associated with keys on the keypad 38 of FIG. 1. Other implementations may incorporate a touch-sensitive display screen. In such implementations, the soft key indicators 84, 86, and 88 may be rendered on areas of the display screen that, when touched, invoke the associated features.

FIG. 4 depicts another example GUI 100 that the user interface module 18 may present to the user 20. A title bar 102 identifies the GUI 100 as a guide view. Immediately below the title bar 102, a detailed intersection view 104 depicts upcoming intersections or other points of interest. For example, text bars 106 and 108 identify upcoming intersections as Cherry St. and 126th St., respectively. A map area 110 depicts the vehicle as an icon 112, such as an arrowhead pointing along the current heading vector. An arrow 114 represents the current path of the vehicle, assuming the vehicle does not make any turns or similar maneuvers. The map area 110 may be depicted using a north-up representation or using a forward-up representation and is automatically updated as the vehicle progresses. In addition, the user 20 can scroll through the map area 110 using the keypad 38, the microphone 42, or another suitable input device.

Below the detailed intersection view 104, soft key indicators facilitate activation of various features. For example, a "menu" soft key indicator 116 may allow the user 20 to access a menu of configuration and other options. A "plan" soft key indicator 118 may allow the user 20 to access a menu for planning a route, e.g., by selecting from a list of recent destinations or favorite destinations. A "list" soft key indicator 120 may allow the user 20 to toggle the display to show the dynamic intersection list 78 as depicted in FIG. 3. In some implementations, the soft key indicators 116, 118, and 120 are visually and logically associated with keys on the keypad 38 of FIG. 1. Other implementations may incorporate a touch-sensitive display screen. In such implementations, the soft key indicators 1116, 118, and 120 may be rendered on areas of the display screen that, when touched, invoke the associated features.

As demonstrated by the foregoing discussion, various implementations may provide certain advantages. Because the navigation system presents information to the user 20 based on the current location and heading vector of the vehicle rather than on pre-programmed route information, the user 20 can receive information regarding points of interest without entering a planned destination. The readability and usability of the information conveyed to the user 20 is enhanced, particularly in relatively inexpensive vehicle navigation systems having small display screens. Such systems are better able to provide the user 20 with enough information to discern nearby points of interest without cluttering the screen with so much information that the display becomes unusable. Navigation systems having larger screens can also benefit from reduced clutter.

It will be understood by those who practice the invention and those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A method to communicate to an occupant of a vehicle information relating to a location of the vehicle in the absence of predetermined destination or route information, the method comprising:
    determining the location of the vehicle;
    determining a heading vector associated with the vehicle;
    identifying a point of interest as a function of the location of the vehicle and the heading vector associated with the vehicle without reference to any predetermined destination; and
    communicating the point of interest to the occupant of the vehicle without reference to any predetermined destination.

2. The method of claim 1, wherein communicating the point of interest to the occupant of the vehicle comprises displaying a graphic representation of the point of interest and a graphic representation of the vehicle using a display device.

3. The method of claim 1, wherein communicating the point of interest to the occupant of the vehicle comprises generating an audible indicator of the point of interest using an audio device.

4. The method of claim 1, wherein determining the location of the vehicle comprises identifying a street on which the vehicle is located.

5. The method of claim 4, wherein the point of interest is an intersection, and further comprising identifying the intersection as a function of the location of the vehicle, the heading vector associated with the vehicle, and a list of intersections along the street.

6. The method of claim 1, further comprising:
    identifying a plurality of points of interest as a function of the location of the vehicle and the heading vector associated with the vehicle; and
    communicating at least one of the points of interest to the occupant of the vehicle.

7. The method of claim 6, further comprising communicating the at least one of the points of interest to the occupant of the vehicle as a sequence of successive points of interest.

8. The method of claim 7, further comprising communicating the successive points of interest in response to input received from the occupant of the vehicle.

9. The method of claim 7, further comprising communicating the successive points of interest in response to movement of the vehicle.

10. A point of interest display system for use in a vehicle, the point of interest display system comprising:
    a global positioning system (GPS) receiver configured to determine a location of the vehicle;
    a data retrieval device configured to retrieve, from a data storage medium, navigation data representing a plurality of points of interest; and
    a processor-based subsystem operatively coupled to the GPS receiver and to the data retrieval device and configured to
        determine a heading vector associated with the vehicle,
        receive the navigation data from the data retrieval device,
        select a point of interest from the plurality of points of interest as a function of the location of the vehicle and the heading vector associated with the vehicle without reference to any predetermined destination, and
        communicate the point of interest to an occupant of the vehicle without reference to any predetermined destination.

11. The point of interest display system of claim 10, further comprising a display device operatively coupled to the processor-based subsystem, wherein the processor-based subsystem is configured to cause the display device to display a graphic representation of the point of interest and a graphic representation of the vehicle.

12. The point of interest display system of claim 10, further comprising an audio output device operatively coupled to the processor-based system, wherein the processor-based subsystem is configured to cause the audio output device to generate an audible indicator of the point of interest.

13. The point of interest display system of claim 12, further comprising a speech module operatively coupled to the processor-based system and to the audio output device and configured to generate a speech indicator of the point of interest.

14. The point of interest display system of claim 10, wherein the processor-based system is further configured to determine the location of the vehicle comprises identifying a street on which the vehicle is located.

15. The point of interest display system of claim 14, wherein the point of interest is an intersection, and wherein the processor-based system is further configured to identify the intersection as a function of the location of the vehicle, the heading vector associated with the vehicle, and a list of intersections along the street.

16. The point of interest display system of claim 10, wherein the processor-based system is further configured to:
identify a plurality of points of interest as a function of the location of the vehicle and the heading vector associated with the vehicle; and
communicate at least one of the points of interest to the occupant of the vehicle.

17. The point of interest display system of claim 16, wherein the processor-based system is further configured to communicate the at least one of the points of interest to the occupant of the vehicle as a sequence of successive points of interest.

18. The point of interest display system of claim 17, further comprising an input device operatively coupled to the processor-based system and configured to receive input from the occupant, wherein the processor-based system is further configured to communicate the successive points of interest in response to input received from the occupant of the vehicle.

19. The point of interest display system of claim 18, wherein the input device comprises at least one of a keypad and an audio input device.

20. The point of interest display system of claim 17, wherein the processor-based system is further configured to communicate the successive points of interest in response to movement of the vehicle.

21. The point of interest display system of claim 10, wherein the data retrieval device comprises at least one of a memory device, an optical retrieval device, and a magnetic retrieval device.

22. A processor-readable medium containing processor-executable instructions that, when executed by a processor-based system in a vehicle, cause the processor-based system to:
determine a location of the vehicle and a heading vector associated with the vehicle;
identify a point of interest as a function of the location of the vehicle and the heading vector associated with the vehicle without reference to any predetermined destination; and
communicate the point of interest to the occupant of the vehicle without reference to any predetermined destination.

23. The processor-readable medium of claim 22, wherein the processor-executable instructions cause the processor-based system to display a graphic representation of the point of interest and a graphic representation of the vehicle using a display device without reference to any predetermined destination.

24. The processor-readable medium of claim 22, wherein the processor-executable instructions cause the processor-based system to generate an audible indicator of the point of interest using an audio device.

25. The processor-readable medium of claim 22, wherein the processor-executable instructions cause the processor-based system to identify a street on which the vehicle is located.

26. The processor-readable medium of claim 25, wherein the point of interest is an intersection, and wherein the processor-executable instructions cause the processor-based system to identify the intersection as a function of the location of the vehicle, the heading vector associated with the vehicle, and a list of intersections along the street.

27. The processor-readable medium of claim 22, wherein the processor-executable instructions cause the processor-based system to:
identify a plurality of points of interest as a function of the location of the vehicle and the heading vector associated with the vehicle; and
communicate at least one of the points of interest to the occupant of the vehicle.

28. The processor-readable medium of claim 27, wherein the processor-executable instructions cause the processor-based system to communicate the at least one of the points of interest to the occupant of the vehicle as a sequence of successive points of interest.

29. The processor-readable medium of claim 28, wherein the processor-executable instructions cause the processor-based system to communicate the successive points of interest in response to input received from the occupant of the vehicle.

30. The processor-readable medium of claim 28, wherein the processor-executable instructions cause the processor-based system to communicate the successive points of interest in response to movement of the vehicle.

* * * * *